United States Patent
McIntosh et al.

(10) Patent No.: US 7,349,175 B2
(45) Date of Patent: Mar. 25, 2008

(54) MEDIA CARTRIDGE STORAGE DEVICE FOR AN AUTOLOADING DATA STORAGE AND RETRIEVAL SYSTEM

(75) Inventors: Michael Philip McIntosh, Tucson, AZ (US); Shawn Michael Nave, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 11/030,848

(22) Filed: Jan. 6, 2005

(65) Prior Publication Data

US 2006/0146439 A1 Jul. 6, 2006

(51) Int. Cl.
G11B 15/00 (2006.01)
G11B 15/68 (2006.01)
G11B 5/008 (2006.01)
G11B 17/00 (2006.01)
G11B 17/03 (2006.01)
G11B 17/04 (2006.01)
G11B 33/02 (2006.01)

(52) U.S. Cl. .................. 360/91; 360/92; 360/93; 720/614; 720/615; 720/633

(58) Field of Classification Search ............... 360/91, 360/92, 93; 720/633, 615, 614; 700/214; 414/266, 269, 270, 277, 280; 312/223.1, 312/223.2, 266, 267, 268
See application file for complete search history.

(56) References Cited

U.S. PATENT DOCUMENTS

| | | | |
|---|---|---|---|
| 4,654,727 A * | 3/1987 | Blum et al. ................ 360/71 |
| 4,779,151 A | 10/1988 | Lind et al. .................. 360/92 |
| 4,846,619 A | 7/1989 | Crabtree et al. ........... 414/273 |
| 5,161,929 A * | 11/1992 | Lichti, Sr. .............. 414/331.04 |
| 5,820,237 A * | 10/1998 | Robey ....................... 312/268 |
| 5,847,897 A * | 12/1998 | Marlowe .................... 360/92 |
| 5,856,894 A * | 1/1999 | Marlowe .................... 360/92 |
| 6,381,089 B1* | 4/2002 | Helmick et al. ............. 360/92 |
| 6,693,758 B2 | 2/2004 | Patterson et al. ........... 360/69 |
| 7,145,747 B2* | 12/2006 | Brace et al. ................. 360/92 |
| 2001/0036144 A1* | 11/2001 | Goto et al. ................ 369/192 |
| 2002/0057514 A1* | 5/2002 | Patterson et al. ........... 360/69 |
| 2004/0165489 A1 | 8/2004 | Goodman et al. ........ 369/30.42 |
| 2004/0179293 A1* | 9/2004 | Collins et al. .............. 360/92 |
| 2004/0264039 A1* | 12/2004 | Armagost et al. ........... 360/92 |

OTHER PUBLICATIONS http://www.hanel.us/pc/ie/en/rotomat/cont.htm.*

* cited by examiner

Primary Examiner—Andrea Wellington
Assistant Examiner—Adam B Dravininkas
(74) Attorney, Agent, or Firm—Zilka-Kotab, PC (57) ABSTRACT

A cartridge storage device includes a housing having a front and a back. A plurality of cells are mounted in the housing, each cell adapted for receiving a media cartridge. A drive mechanism drives the cells towards a front opening in the front of the housing for allowing insertion and retrieval of the cartridges from the cells by the picker. Optionally, the back of the housing can have a rear opening for allowing in situ user-insertion and retrieval of the cartridges from the cells as well as viewing of the cartridges.

26 Claims, 11 Drawing Sheets

MEDIA CARTRIDGE STORAGE DEVICE FOR AN AUTOLOADING DATA STORAGE AND RETRIEVAL SYSTEM

FIELD OF THE INVENTION

The present invention relates to media cartridge storage devices, and more particularly, this invention relates to a modular multi-cartridge storage device.

BACKGROUND OF THE INVENTION

Data storage drives, such as data tape drives, record information to and read information from media, such as the data tape of a tape cartridge. Data storage drives are often used in conjunction with, for example, a data storage and retrieval system. One example of such a system is an automated data storage library with robotic picking devices, wherein removable media cartridges are selectively transported between storage cells and data storage drives in an automated environment. Herein, automated data storage library, data storage library, tape library system, data storage and retrieval system, and library may all be used interchangeably.

Once requested, data that is stored on data storage media of an automated data storage library typically is needed quickly. Thus, it is desirable that an automated data storage library be maintained in an operational condition on a continuous basis as much as possible. As a result, user expectations have moved toward a concept of continuous availability, such as the well known "24×7×365" availability.

In automated storage libraries, one of the most important concerns is the amount of storage a library can provide for a given amount of physical space, or library footprint. A challenge in the design of storage libraries is to maximize storage density while maintaining flexibility and scalability. Many automated libraries today have frames in which there are two types of slots: storage slots for data cartridges and drive slots for tape drives. Very often it is found that users do not populate all of the drive slots available. Rather, these unused drive slots openings are covered up with a panel (called a filler panel) and more storage slots are placed on the panel to increase storage capacity. However, when this happens all of the other space behind the panel where a drive could be located becomes unused and empty. Additionally, it is currently not possible to store tape cartridges in the unused drive slots, thus the unused drive slot is wasted space.

I/O stations in automated tape libraries are used to input tape cartridges by the library operator to a location where the picker mechanism of the library can grab the cartridge. There are limitations with the way that I/O stations are currently used today: I/O stations have a defined location in a frame, e.g., in one tape library, the I/O stations are only allowed in a specific frame at one end of the library. Also, these I/O stations consume a large amount of storage space within the library, e.g., in one library, addition of 30 I/O slots causes the library to lose 80 storage slots. An additional drawback is that these I/O stations are not easily serviceable. Also the scalability of I/O stations is limited.

In the art, data storage magazines are provided for adding or removing more than one cartridge at a time. Magazines may also be used to add or remove storage capacity. Magazines require that the library door be opened in order to add or remove the magazine. This is a disruptive activity as the automated data storage library must be paused or stopped during the addition or removal of the magazines. There is a need to provide a system and method for adding or removing storage without disrupting the automated data storage library.

In addition, data storage drives are added to or removed from a data storage library as needed. Some libraries offer additional storage cells where drives may otherwise exist. A conversion is required to remove this additional storage whenever a drive is required to takes its place. Conversely, a conversion is also required if a drive is removed and replaced with the additional storage. The conversion requires that the library door be opened and this disrupts normal library operation. In addition, tools are required to perform these conversions and this process usually requires a trained service technician. There is a need to provide a portable and flexible storage cell conversion in an automated data storage library.

One attempt at increasing storage space in a tape library is presented in U.S. Pat. No. 6,693,758 to Patterson et al. The proposed solution is a tape cartridge transport magazine that is insertable in a library alongside a tape drive. The tapes are retrieved through slots in the sidewall. However, there are several drawbacks to this system. One drawback is that the magazine must be positioned alongside the drive, and so the magazine is not truly modular. Further, the side placement means that the maximum number of magazines that a single drive can service is two.

Another drawback is that tapes are loaded/unloaded from the side, so the magazine must be physically removed from the library to load it. Or the user must insert individual tape cartridges one-by-one into the library and have the picker load them into the magazine sequentially. This makes the picker unavailable for other applications during that time. A further drawback is that users cannot see which tapes are in the magazine without physically removing the magazine from the library and then physically removing the tapes.

What is therefore needed is a new apparatus for maximizing tape cartridge storage capacity in a storage library.

What is also needed is an apparatus that utilizes what would otherwise be wasted storage space in storage slots.

What is further needed is an apparatus for input/output of cartridges that is truly modular and that can be positioned at any location in the library without shutting down the system.

SUMMARY OF THE INVENTION

The present disclosure describes a novel apparatus for storing data cartridges, e.g., tape cartridges, within a data storage and retrieval system, e.g., a tape library. The disclosure describes a cartridge storage device designed to fit in an unused drive slot. The apparatus is capable of storing a number of data cartridges, with each cartridge stored on a transport mechanism that feeds the cartridge to the front of the apparatus for access by the system picker. By storing the cartridges in this fashion, the depth of the drive slot can be maximized for storing tape cartridges.

Accordingly, data cartridges can be stored in removable and "hot swappable" cartridge storage devices which can be placed into a drive slot to increase the amount of storage in an automated tape library. Since the depth of the drive slot is much deeper than a normal storage slot, this mechanism allows for data cartridges to be stored at a depth not previously available in a tape library. This mechanism also provides a means for the data cartridge to be moved from the full depth of the drive slot to the front of the drive slot where the cartridge can be accessed by the picker.

One of the many advantages of this invention is that the storage capacity of the library can be increased utilizing the existing empty space within the library. For instance, in an IBM 3584 D32 library frame with no drive canisters and 12 cartridge storage devices the storage capacity of the library can increase by 52 cartridges, or 12%. Another advantage of the cartridge storage device over the filler panel is that filler panels are currently used to cover 4 drive slots. If one drive canister is in place, three empty drive slots do not have any storage slots. The cartridge storage devices could fill these empty drive slots in any combination which adds flexibility and scalability of storage. In this particular case the cartridge storage devices could increase the library storage by 61 cartridges or 14%. In other libraries that have filler panels that cover 10 drive slots, one drive can create nine unused drive slots which could be filled with cartridge storage devices providing 72 more cartridges to the library.

A cartridge storage device according to one embodiment includes a housing having a front and a back. A plurality of cells are mounted in the housing, each cell adapted for receiving a tape cartridge. A drive mechanism, e.g., motor and belt traveling in a closed loop, selectively drives the cells towards a front opening in the front of the housing for allowing insertion and retrieval of the cartridges from the cells by the picker. The cartridges preferably sequentially protrude beyond the front opening when driven towards the front opening, e.g., when traveling along the closed loop, to facilitate grasping by the picker. As an option, the back of the housing can have a rear opening for allowing in situ user-insertion and retrieval of the cartridges from the cells, as well as viewing the cartridges. The cartridge storage device may also include a controller and a connector for allowing the data storage and retrieval system to communicate with the controller of the cartridge storage device.

The cartridges may have a nonvolatile memory, e.g., radio frequency identification (RFID) tag, coupled thereto. Thus, a reader can be provided for reading the nonvolatile memory of a cartridge. Alternatively, each cell can have an electrical connector that engages the cartridge for allowing communication with a nonvolatile memory of the cartridge. In another embodiment, an optical scanner can be provided for reading an optical code, e.g., bar code, of a cartridge. The reader/scanner can be coupled to the housing, coupled to the picker, etc.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION OF THE PREFERRED EMBODIMENTS

The following description is the best embodiment presently contemplated for carrying out the present invention. This description is made for the purpose of illustrating the general principles of the present invention and is not meant to limit the inventive concepts claimed herein.

Figure 1:
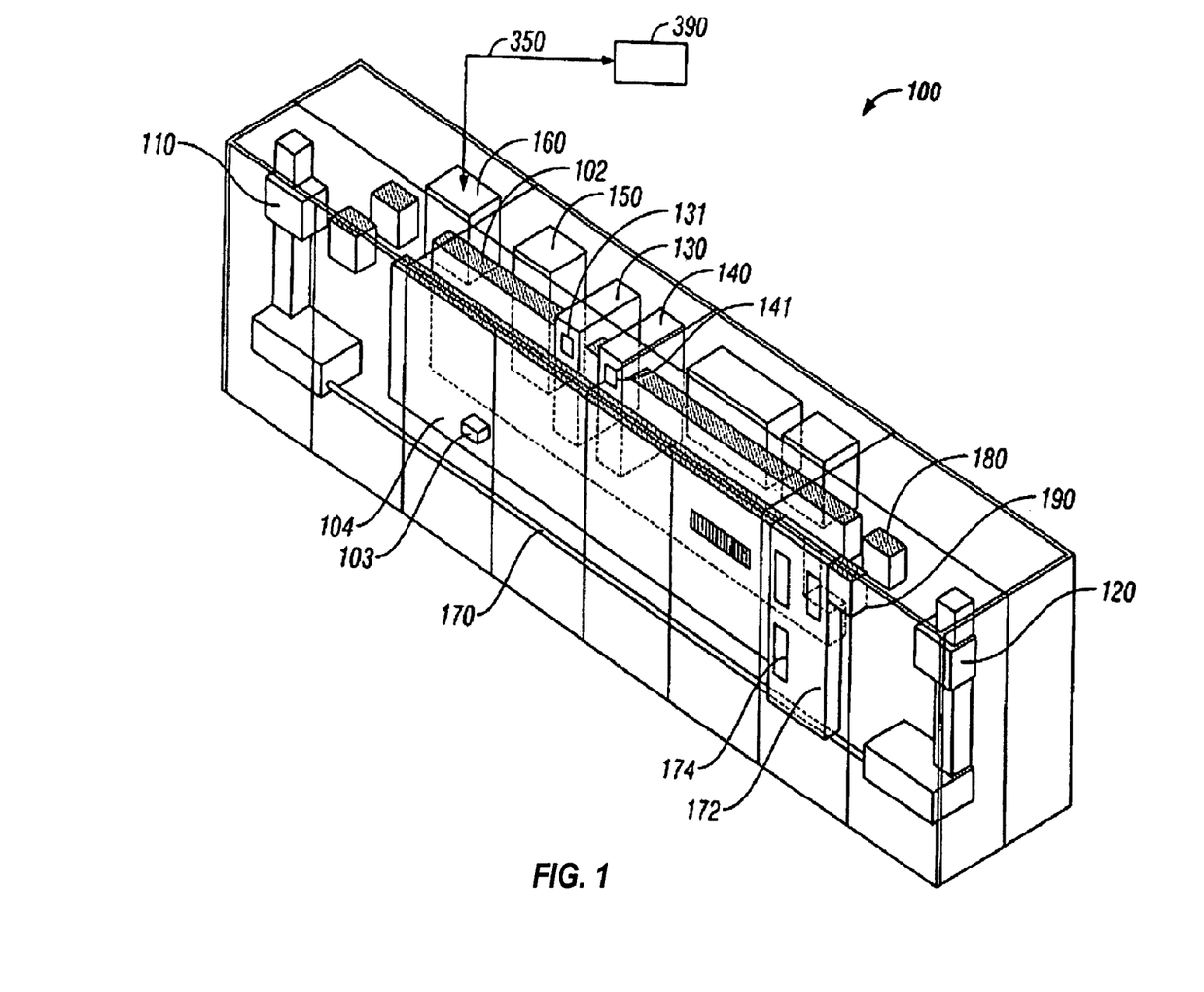
FIG. 1 is an isometric view of one embodiment of a data storage and retrieval system constructed in accordance with the present invention.
Figure 3:
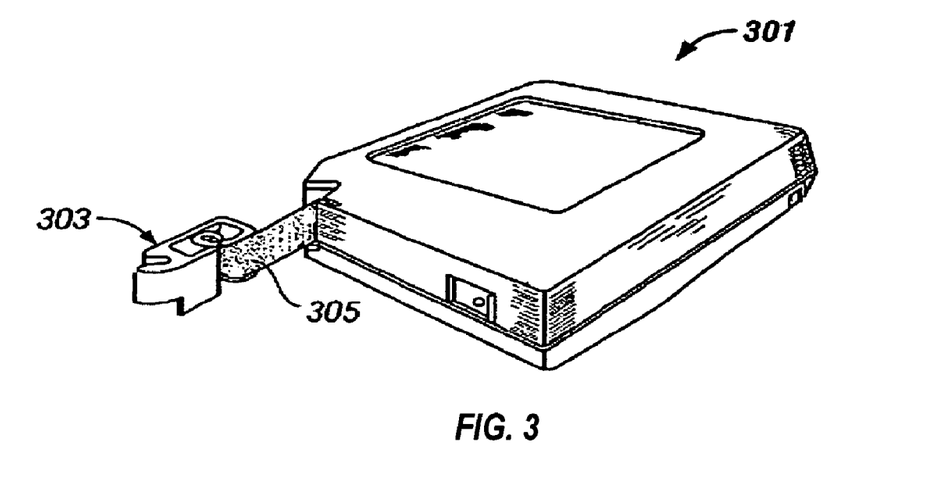
FIG. 3 is an isometric view of a removable tape cartridge used in conjunction with the tape drive of FIG. 2.

Referring to FIG. 1, a data storage and retrieval system 100 is shown. In the embodiment illustrated, data storage and retrieval system 100 is depicted as a robotic library. The upper interface of controller 160 allows data storage and retrieval system 100 to communicate with one or more hosts 390 via link 350. Link 350 may comprise an Ethernet, Infiniband, TCP/IP, Fibre Channel-Arbitrated Loop, SCSI, ESCON, FICON, or the like, depending on the application. The lower interface of controller 160 communicates with a plurality of drives that are positioned in drive enclosures 130 and 140. Drive enclosures 130 and 140 receive removable media cartridges 103 (e.g., see cartridges in FIGS. 3, 6, and 7), via robotic pickers 110 and 120. The removable media cartridges 103 may include or contain magnetic tape, optical tape, optical disk media, magneto-optical disk, CD, DVD, phase-change media, floppy disk, removable hard disk, electronic media, and the like. Robotic pickers 110 and 120 travel along rail 170 to move removable media cartridges 103 from inner storage wall 102 and outer storage wall 104 to drive enclosures 130 and 140 for the purposes of reading and/or writing data. Robotic pickers 110 and 120 also return the removable media cartridges 103 to storage walls 102 and 104.

An import/export station 172 includes access door 174 attached to the side of data storage and retrieval system 100. Access door 174 is preferably pivotally attached to the side of data storage and retrieval system 100; however, access door 174 could be slidably or otherwise attached. An operator panel or access station 150 permits a user to communicate directly with data storage and retrieval system 100. The operator access station 150 typically contains an LCD display, a keyboard or touch screen for user input, and circuits to monitor and control the I/O station doors.

First power component 180 and second power component 190 each comprise one or more power supplies that supply power to pickers 110 and 120, controller 160, operator access station 150, and drive enclosures 130 and 140 of data storage and retrieval system 100. Typically, at least one of the power components 180 and 190 provides direct current (DC) power, since most computer peripheral devices use DC power. One of the power components 180 and 190 may provide alternating current (AC) power as well. Controller 160 is in communication with power components 180 and 190, pickers 110 and 120, operator access station 150, drive enclosures 130 and 140, and data storage drives (see FIGS. 2, 10, 11) of data storage and retrieval system 100.

Figure 2:
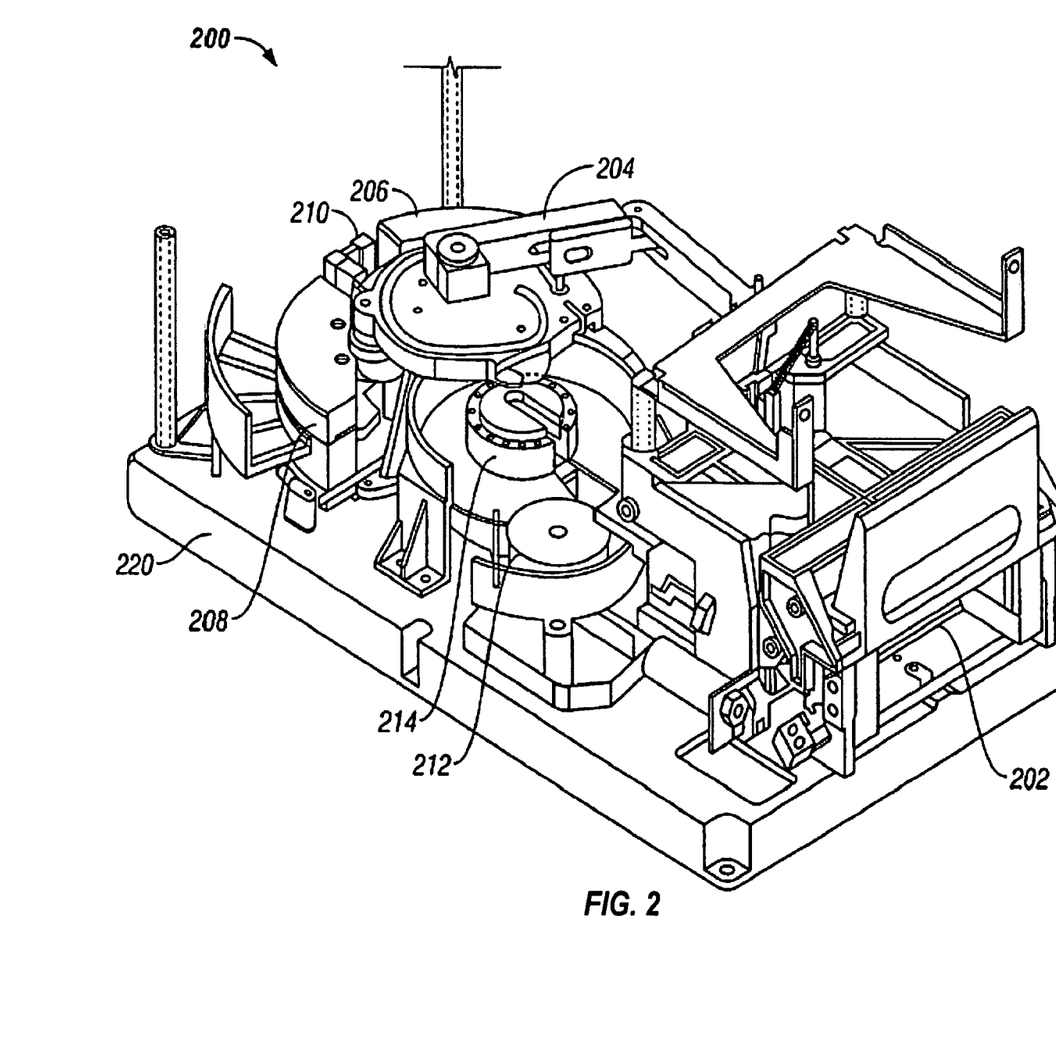
FIG. 2 is an isometric view of a tape drive utilized by the data storage and retrieval system of FIG. 1.

Referring now to FIG. 2, a typical reel-to-reel tape drive 200 is shown. As described above, any removable media data storage drive may be used, such as tape drives, optical and magnetic disk drives, electronic media drives, or any other drives and media as is known to those skilled in the art. A plurality of drives 200 are usually located inside of the library 100 of FIG. 1. Tape drive 200 may be any one of, for example, a family of tape drives using a single-reel tape cartridge, such as the IBM 3480, IBM 3490, IBM 3590, Digital Linear Tape (DLT), and Linear Tape Open (LTO) tape drives. Cartridge loader 202 receives a single-reel tape cartridge 301 (see FIG. 3) and threader 204 threads the leader-block 303 of the tape 305 around the tape guides 206 and 208, and around the tape tension transducer 212, and into the take-up reel 214. Tape guides 206 and 208 support the tape as the tape moves over the magnetic tape head 210. All of these components are supported by base plate 220. One or more tape drives 200 are located inside drive enclosures 130, 140 (FIG. 1) in order to protect the tape drives 200 from dust and debris, as well as extraneous air currents that could disturb the way the magnetic tape 305 passes over the magnetic head 210.

Figure 4:
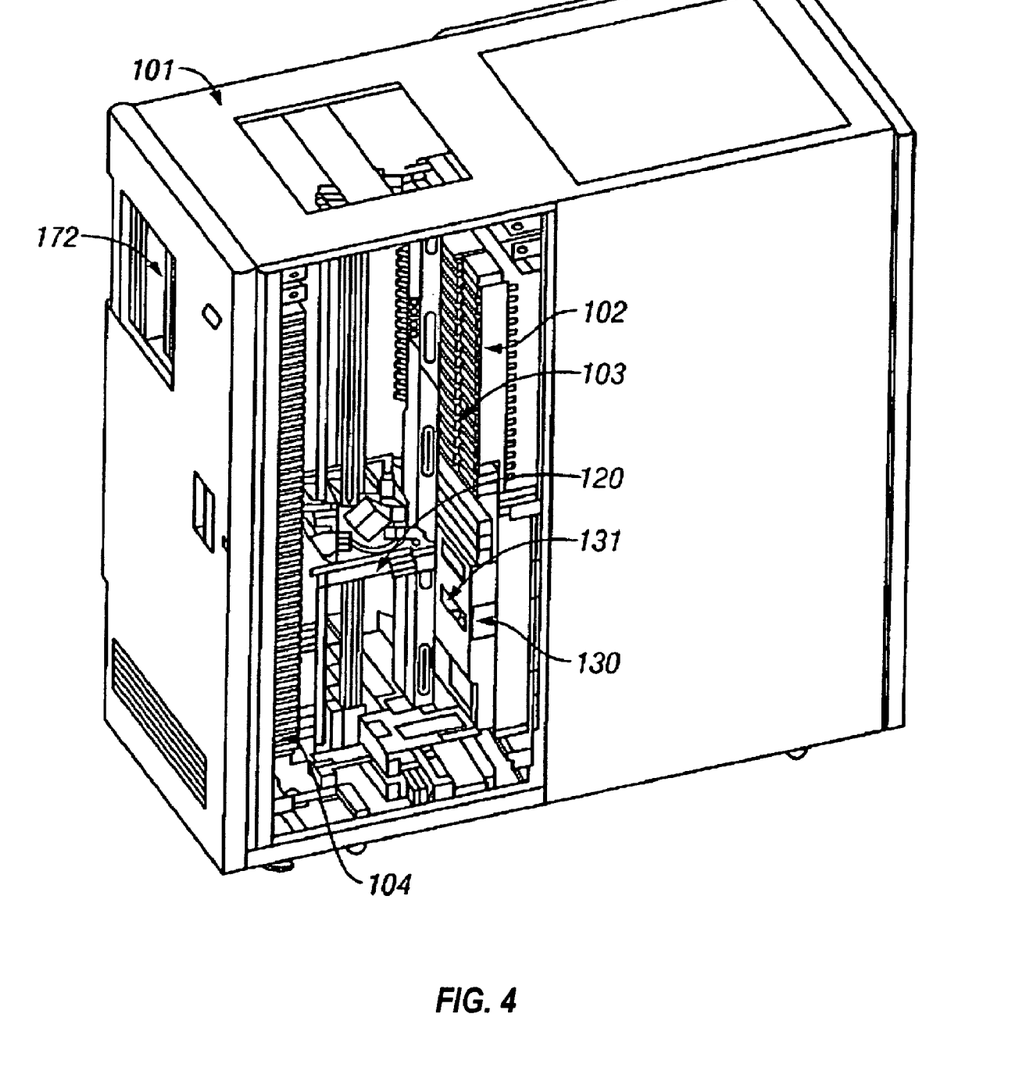
FIG. 4 is an isometric view of a storage module utilized by the data storage and retrieval system of FIG. 1.

The data storage and retrieval system 100 of FIG. 1 is typically assembled from a series of frames or storage modules 101, such as the L-frame type storage module illustrated in FIG. 4. A storage module is an expansion component of the library. Frames, accessors, magazines, etc. may comprise examples of storage modules. The storage module may comprise one or more of the following: one or more storage shelves for holding data storage media, one or more data storage drives for reading and/or writing data on the data storage media, one or more import/export stations for operator access to the data storage media, one or more accessors for moving the data storage media to/from data storage drives and storage shelves, one or more frames or compartments for holding additional storage modules or library components. In the example of FIG. 1, the desired number of storage modules 101 are assembled into data storage and retrieval system 100. Storage module 101 comprises a picker 120, a drive enclosure 130, an inner storage wall 102, and an outer storage wall 104. A plurality of removable storage media 103 are located in each storage wall 102, 104. In this example, removable storage media 103 comprises tape cartridges, but may also comprise other types of media such as those described above.

Figure 8:
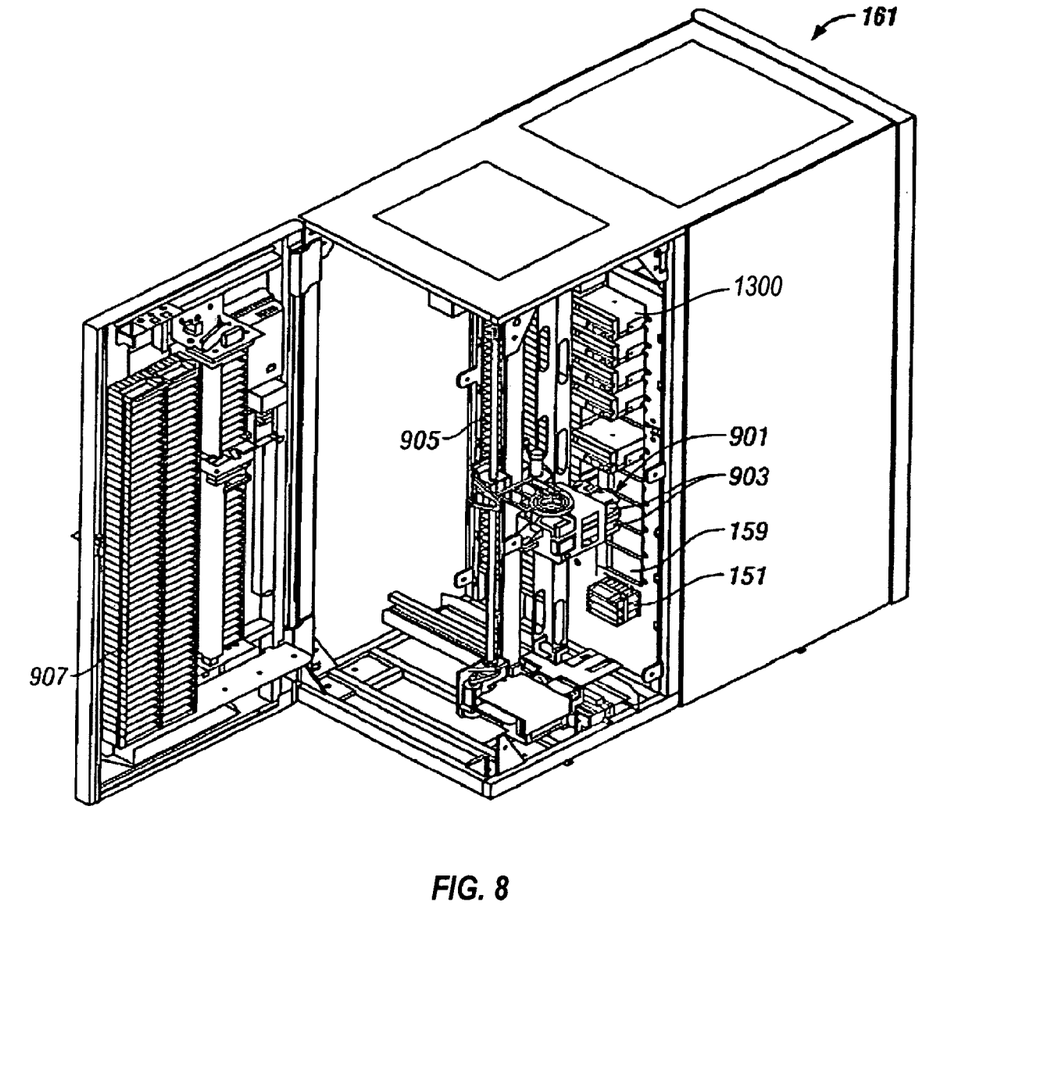
FIG. 8 is an isometric view of an alternate configuration of the storage module of FIG. 4 with a front door open and a rear door closed.
Figure 10:
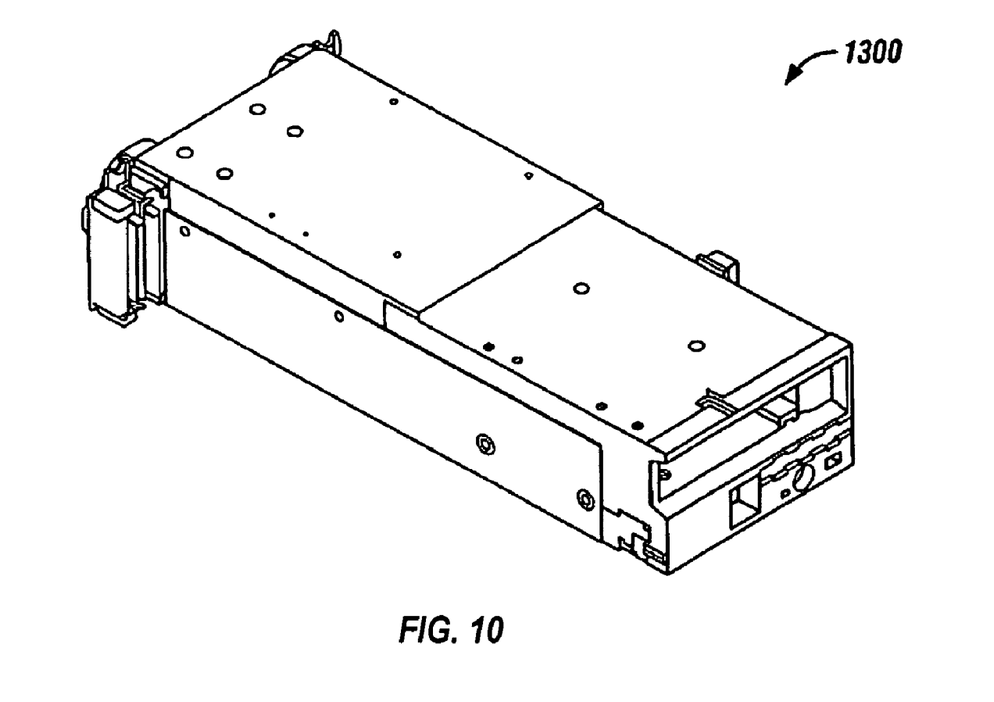
FIG. 10 is a front isometric view of a drive canister.
Figure 11:
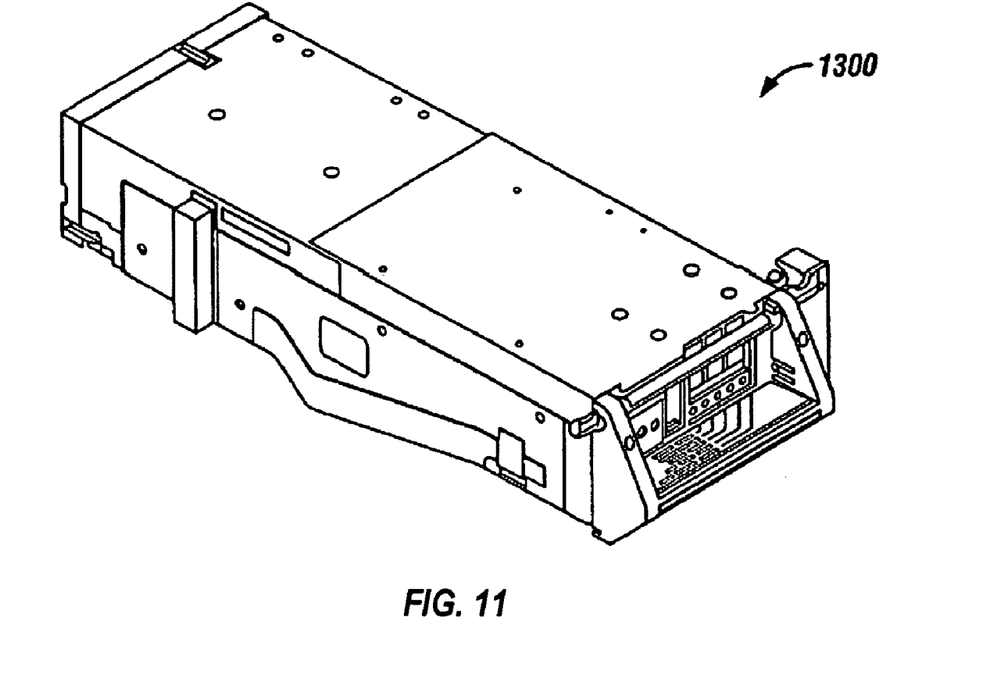
FIG. 11 is a rear isometric view of the drive canister of FIG. 10.

Removable storage media 103 are inserted via robotic pickers 110, 120 into drive enclosures 130, 140 via entrances 131, 141 (FIG. 1), respectively, where removable storage media 103 are mounted inside the data storage drive, such as tape drive 200 (FIG. 2) or data storage drive canister 1300 (FIGS. 8, 10 and 11). Each picker 110, 120 includes a gripper assembly having a bar code scanner for reading cartridge labels, or other means for identifying the cartridges. As best shown in FIG. 8, a gripper assembly 901 may contain, for example, a plurality of grippers 903. The grippers 903 are mounted in a cage that can pivot from one side of the library to the other. This allows access to both storage walls 905, 907 by either gripper.

Figure 5:
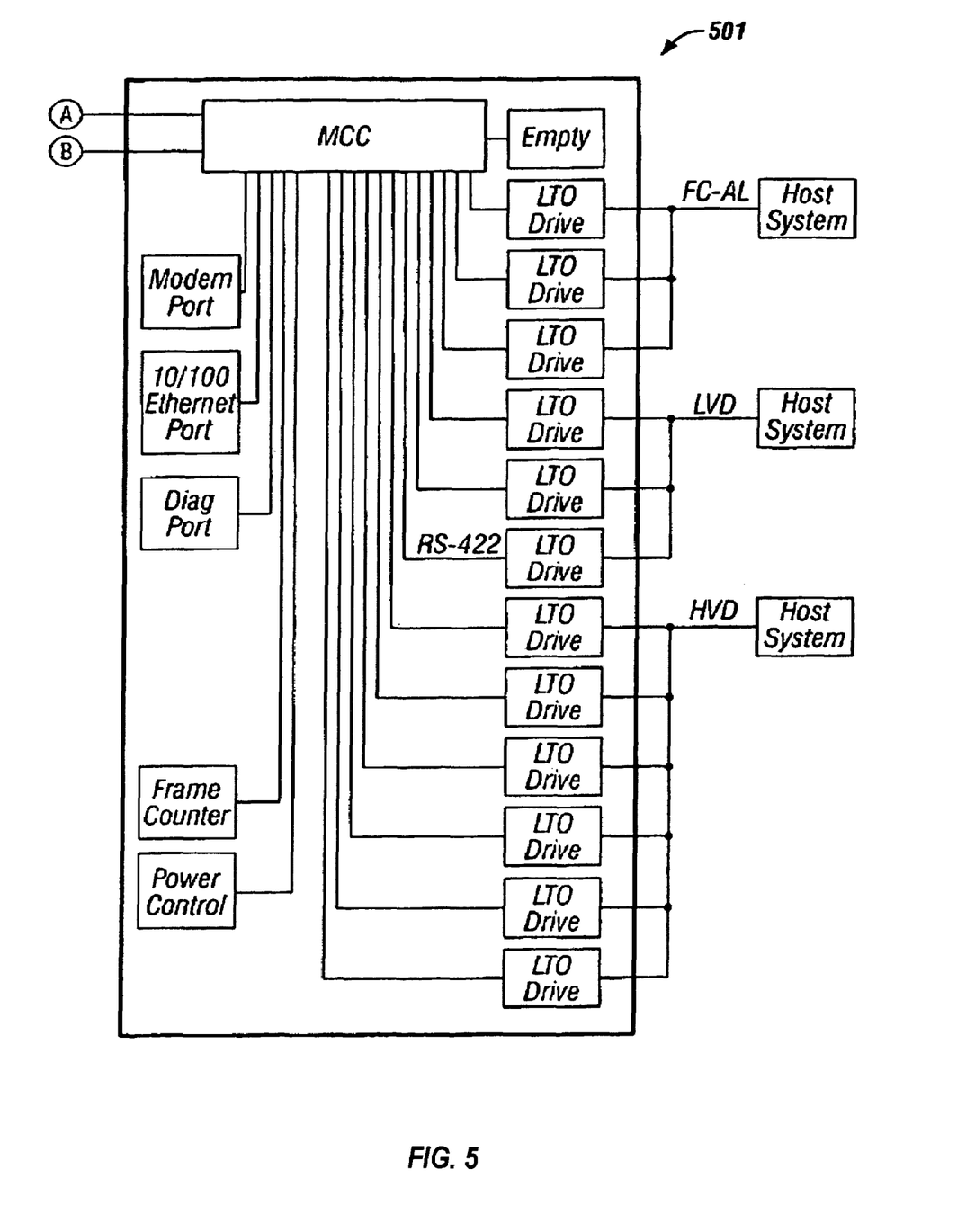
FIG. 5 is a schematic diagram of an alternate storage module utilized by the data storage and retrieval system of FIG. 1.
Figure 6:
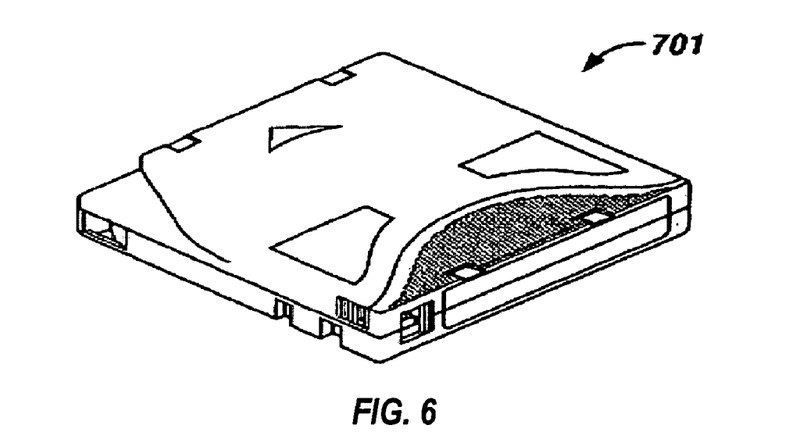
FIG. 6 is an isometric view of an alternate removable tape cartridge usable in conjunction with a tape drive.
Figure 7:
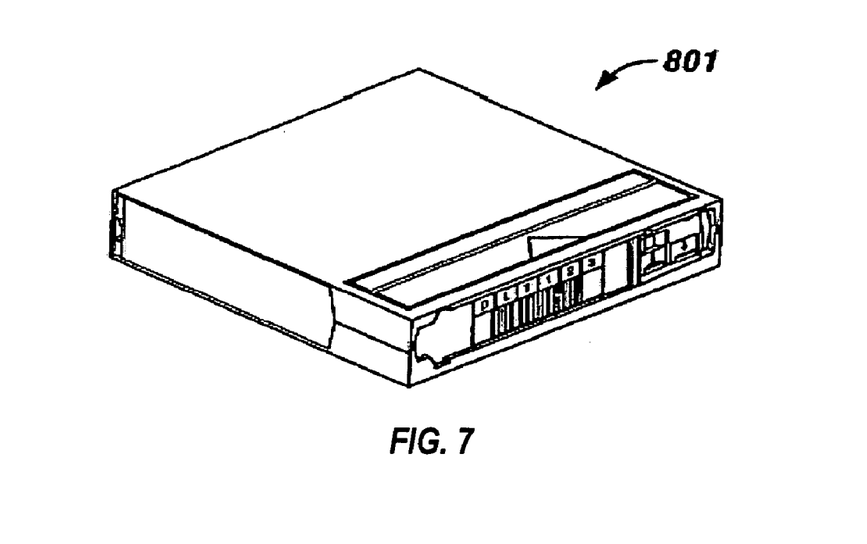
FIG. 7 is an isometric view of another alternate removable tape cartridge usable in conjunction with a tape drive.

Referring now to FIG 5, a schematic diagram of an optional frame or storage module known as a Linear Tape Open (LTO) D-frame 501 is shown. LTO D-frame 501 provides additional storage and may provide additional drives as well. The description is similar to that for storage module 101, except that there may be zero to twelve tape drives for LTO tape cartridges 701 (FIG 6). FIG. 7 shows another alternate removable tape cartridge 801 usable in conjunction with a tape drive. If no drives are installed, then no MCC and supporting circuits/ports will be installed.

To increase the storage capacity of data storage and retrieval system 100, one or more cartridge storage devices fill the space that would otherwise be occupied by an existing drive canister(s) such that the cartridge storage devices can be hot plugged into an existing library drive canister slot. As used herein, a cartridge storage device is a device capable of holding several media cartridges (defined above) for transportation, storage, and use in conjunction with a data storage and retrieval system 100. The cartridge storage device is capable of storing a number of media cartridges, with each cartridge stored on a transport mechanism that feeds the cartridge to the front of the cartridge storage device for access by the library picker 110, 120.

Figure 12:
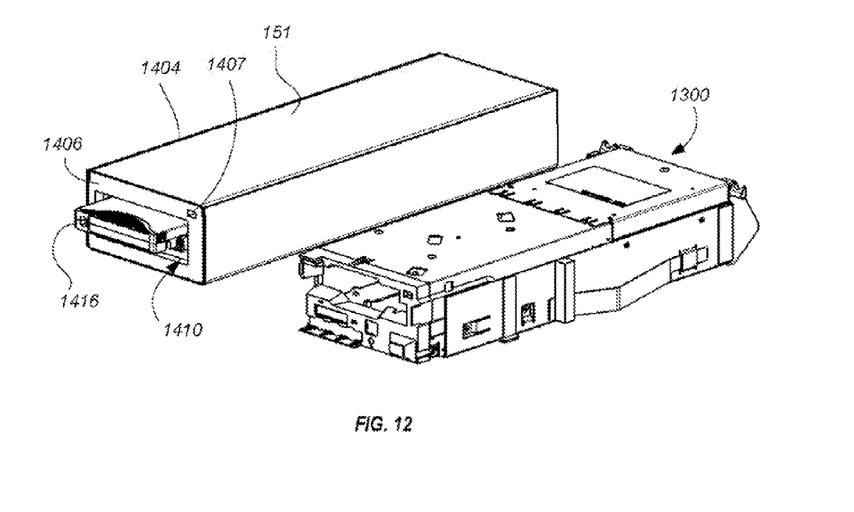
FIG. 12 is an isometric view of a cartridge storage device and a drive canister.

FIG. 12 illustrates the relative sizes of a cartridge storage device 151 and a drive canister 1300. Because the cartridge storage device 151 has about the same size as the drive canister 1300, the cartridge storage device 151 can be placed anywhere in a library string that a drive cat be placed.

Figure 8A:
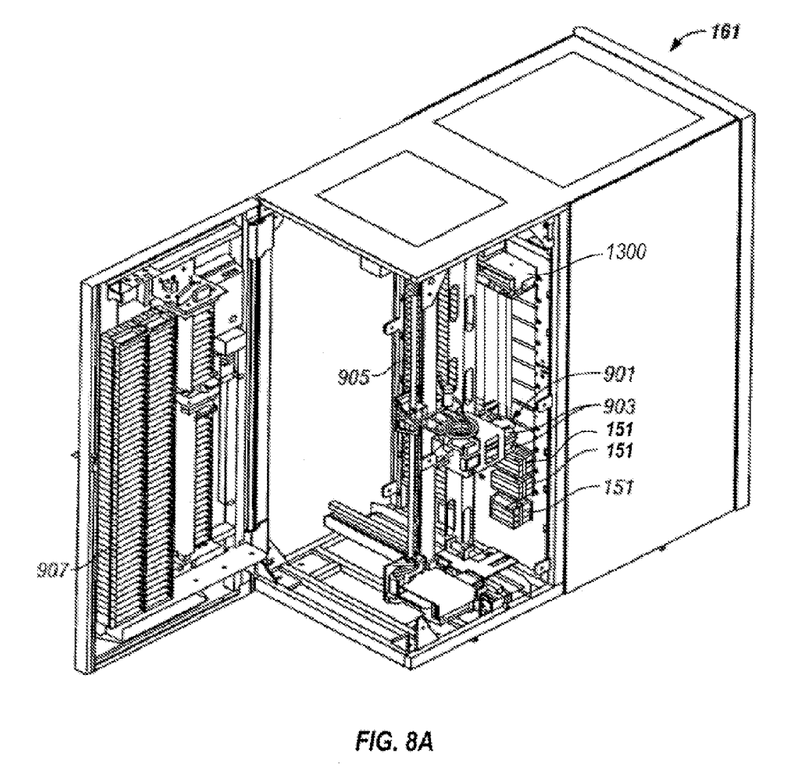
FIG. 8A is an isometric view of the storage module of FIG. 8 with more cartridge storage devices than drive canisters.
Figure 9:
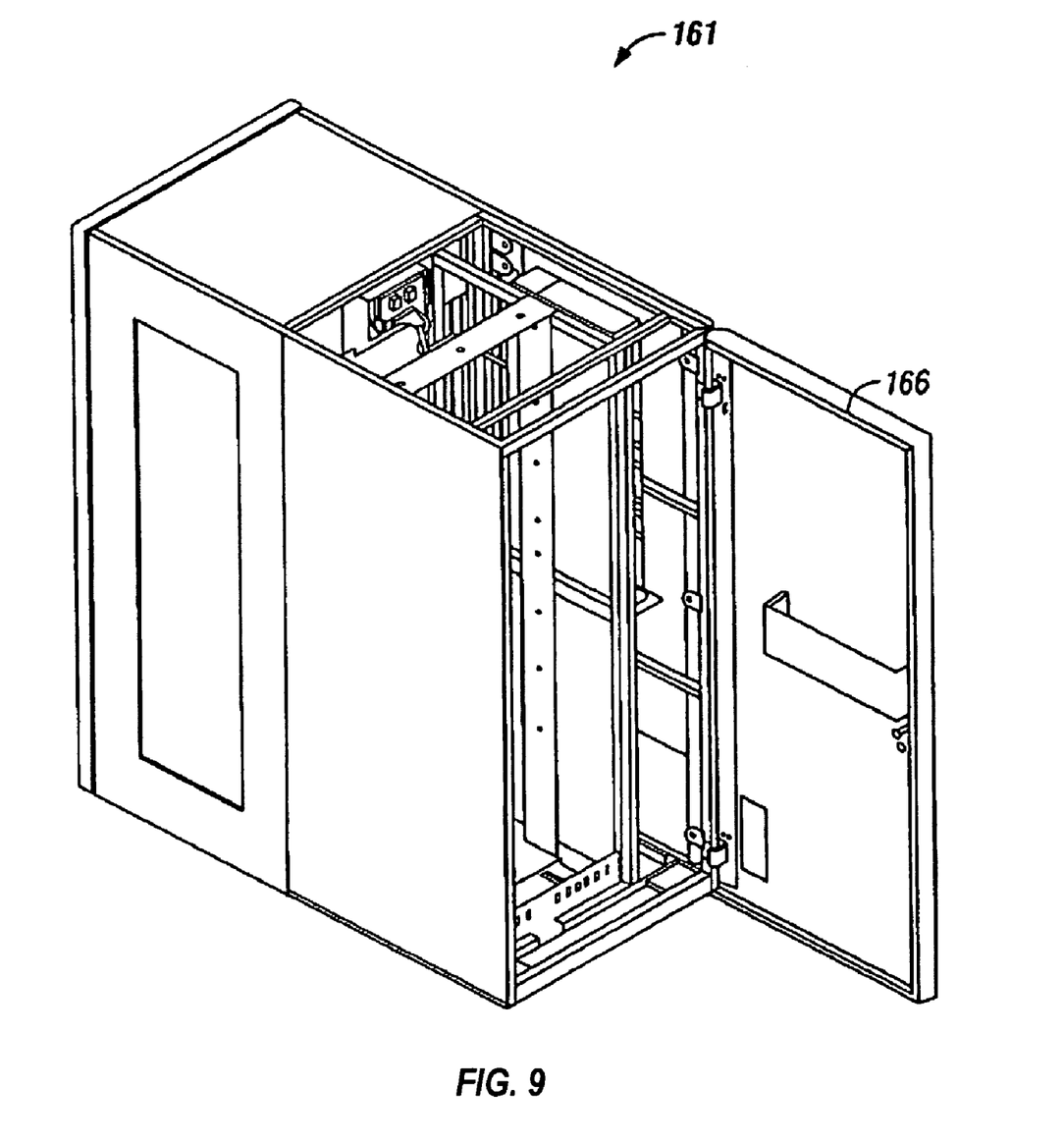
FIG. 9 is a reverse isometric view of the storage module of FIG. 8 with the front door closed and the rear door open.

As shown in FIGS. 8 and 8A, the cartridge storage devices 151 are adapted to be mounted within a standard drive slot or compartment 159 in a frame 161 of the multi-frame library of system 100. The cartridge storage devices may be inserted into compartment slot 159 of frame 161 through a rear door 166 (FIG. 9) of frame 161. The cartridge storage devices 151 are securely mounted in compartment 159 with fasteners or latches. Note that the cartridge storage device 151 may be located in any drive slot or storage slot of any frame in the data storage and retrieval system 100, including those slots adjacent to and those not adjacent to a drive.

For example, in the IBM 3584 library, this would allow for cartridge storage devices 151 to be in the L frame and subsequently any D frame as well. Seeing that customers have the ability to replace drives, they have access to the area of the system 100 where drives are located, thus this area can be used for input/output of data tape cartridges. If the cartridge storage device 151 were to act as a replacement for the conventional I/O stations of today, additional storage slots can be added to the library in this space. Also, since the cartridge storage device 151 is in canister form it can be "hot plugged" for easy installation or removal. In other words, the cartridge storage device 151 can be inserted and removed without shutting the system 100 down. This is a distinct advantage over current I/O stations where the system 100 must be brought down for I/O station addition, removal, or replacement. Another advantage of the cartridge storage device 151 is the scalability since the only limitation for the number of cartridge storage devices 151 in a library string is the number of drive slots 159. Thus several cartridge storage devices 151 could give customers bulk I/O capability that is modularly expandable and simultaneously operable. For example, if using cartridge storage devices 151 in the IBM 3584, each frame could have between 8 and 96 I/O slots. Thus, the cartridge storage devices 151 maximize the storage capacity to physical space ratio. And because the picker can transport the cartridges from the cartridge storage device 151 to any available drive, the storage capacity to drive ratio is maximized as well.

Figure 13:
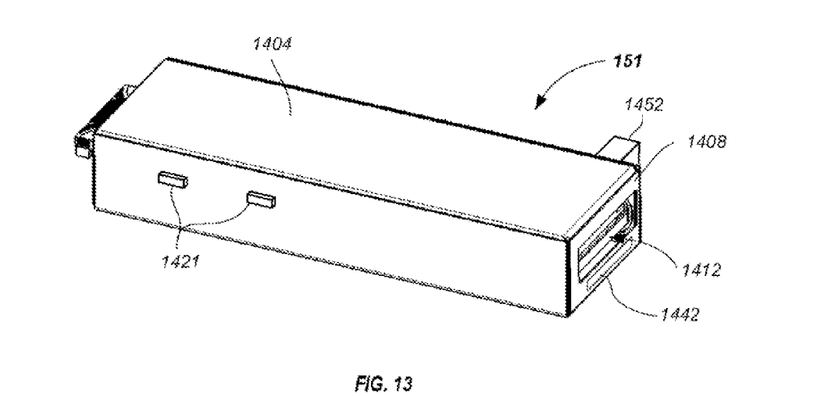
FIG. 13 is another isometric view of the cartridge storage device of FIG. 12.

FIG. 13 is another view of a cartridge storage device 151 according to one embodiment. As shown in FIGS. 12 and 13, the cartridge storage device 151 includes a housing 1404 having a front 1406 and a back 1408. The cartridge storage device 151 is adapted for insertion into the library front-first. The back 1408 of the cartridge storage device 151 is exposed at the outside of the wall holding the slots (though can be enclosed within the library by a protective door, etc.). The housing 1404 can include friction members 1421 for frictionally engaging the slot, or coupling members, thereby maintaining the cartridge storage device 151 in a relatively fixed position. The housing 1404 can also include stops (not shown) that limit the extent that the cartridge storage device 151 can be inserted into the slot. Conversely, the slots can include the friction members that engage the cartridge storage device 151.

Because the cartridge storage device 151 is easily removable, the cartridge storage device 151 is ideal for secure storage, e.g., can be taken off site, stored in a safe, etc. An additional benefit is that data can be loaded onto the cartridges 1416 on one device and the data retrieved from them on a second device. This allows for such things as exchanging data between different libraries without requiring a data link.

Figure 14:
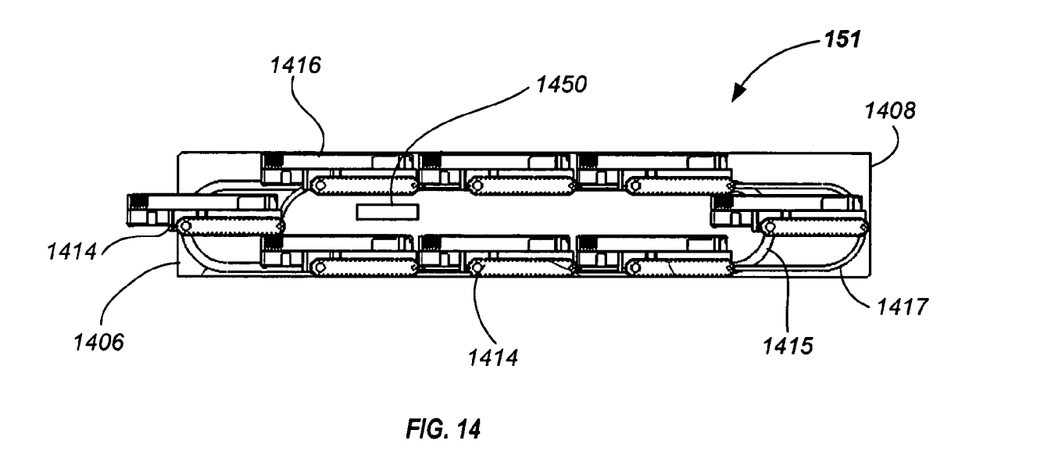
FIG. 14 is a partial side view of the inner mechanism of the cartridge storage device of FIG. 12.
Figure 15:
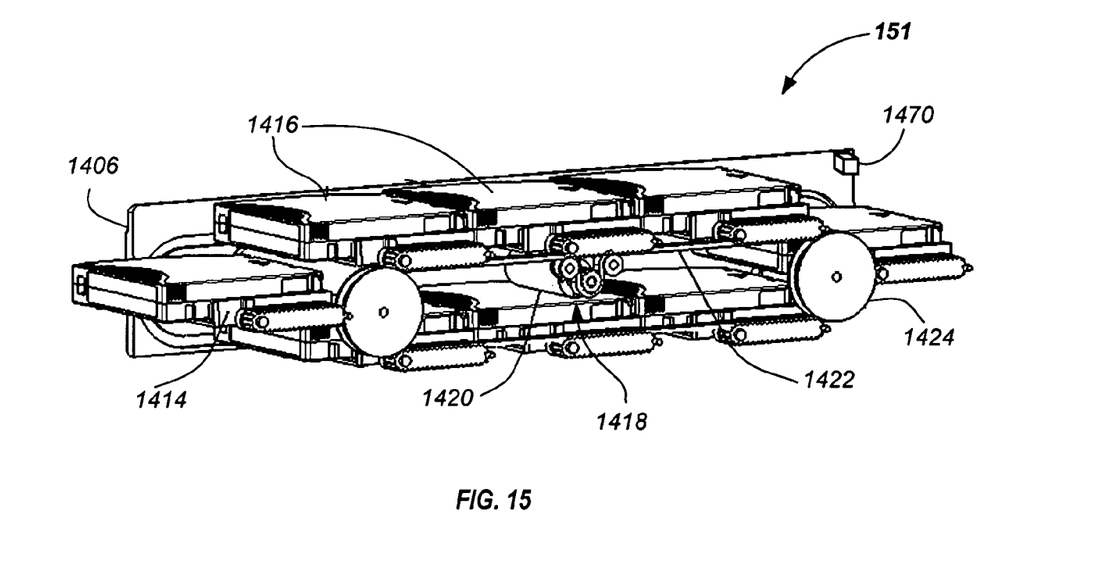
FIG. 15 is a partial isometric side view of the inner mechanism of the cartridge storage device of FIG. 12.

FIGS. 14 and 15 illustrate the inner workings of a cartridge storage device 151 according to a preferred embodiment. As shown, a plurality of cells 1414 are positioned in the housing 1404, each cell 1414 adapted for receiving a tape cartridge 1416. This particular embodiment has a capacity of up to eight data cartridges 1416. However, one skilled in the art will appreciate that more or less cells 1414 can be provided.

A drive mechanism 1418 drives the cells 1414 towards the front opening of the housing 1404. In the embodiments shown, the cartridges are driven in a closed loop through the housing 1404. The cells 1414 are mounted on a track that allows the cells to rotate through the cartridge storage device 151 such that each cell 1414 and cartridge 1416 can be rotated to the front of the cartridge storage device 151 where it can be picked by the robot 110, 120. Empty cells can be rotated through the cartridge storage device for cartridges to be placed into these cells at a later time. The cartridge storage device 151 preferably includes a major track 1415 and a minor track 1417 that keep the cells 1414 oriented in about the same horizontal position throughout the closed loop. The drive mechanism 1418 shown includes a motor 1420 for driving a belt 1422 extending around two pulleys 1424, the cells 1414 being rotatably coupled to the belt. One skilled in the art will appreciate that the drive mechanism can vary from that shown here. For instance, an alternate embodiment has the motor positioned externally, the belt being coupled to a gear that operatively engages the external motor.

One skilled in the art will appreciate that other methods of driving the cells 1414 towards the front opening can be utilized. For instance, the cartridge storage device 151 can include a miniature version of a picker that selects and urges a cartridge towards the front opening. Another potential drive mechanism would include a sliding cell arrangement, where the cells 1414 are horizontally aligned. When a particular cartridge is desired, the cell 1414 would slide out of alignment with the other cells and towards the front opening. Thus, the invention is not to be limited to a belt and motor configuration.

The cells 1414 can be trays upon which the cartridges 1416 rest, and preferably have some type of frictional members (not shown) such as spring arms that hold the cartridges 1416 to the cells 1414 in a relatively fixed state so that they do not come loose during transportation of the cartridge storage device 151 or movement along the closed loop.

The front 1406 of the housing 1404 has a front opening 1410 for allowing insertion and retrieval of the cartridges 1416 from the cells 1414 by the picker 110, 120 operating within the library. Accordingly, the slots in which the cartridge storage devices 151 are positioned have an access opening which allows access to the cartridge storage devices by the picker.

To facilitate picking of the cartridges 1416 from the cartridge storage device 151, the configuration of the drive mechanism is preferably such that the cartridges 1416 sequentially protrude beyond the front opening when traveling along the closed loop. For instance, the front 1406 of the cartridge storage device 151 can contain a bezel through which the cartridges 1416 are picked and placed with a fiducial 1407 (FIG. 12) for calibration of the cartridge storage device 151 within the system 100.

The back 1408 of the housing 1404 optionally has rear opening 1412 for allowing a user to sequentially insert and retrieve tape cartridges 1416 from the cells 1414 while the cartridge storage device 151 is positioned in the library. The rear opening 1412 preferably has doors to keep dust and debris out of the cartridge storage device 151. By opening the doors, the user can sequentially view the cartridges 1416 as the cells travel along the closed loop and while the cartridge storage device 151 is inserted in the slot 159. If the cartridges are labeled or have some type of identifying indicia imprinted thereon (e.g., on the hinged door of the cartridge), the user can view the contents of the cartridge storage device 151 without the need to remove it from the slot.

The cartridge storage device 151 can also include a controller 1450 that receives instructions from the data storage and retrieval system 100 to rotate the cartridges to a desired position, and if a reader is present, read, store, and transmit the information from the on-board memory (as discussed below). A connector 1452 (FIG. 13) allows the data storage and retrieval system 100 to communicate with the controller 1450 when the cartridge storage device 151 is docked.

Some cartridges 1416 have additional nonvolatile memory thereon, e.g., RFID tags or equivalent, that allows the cartridge storage device 151 and/or system 100 to read identification and other information about each individual cartridge using a cartridge storage device-mounted reader 1470 or other reader not coupled to the cartridge storage device. The system can read the memory of each cartridge upon docking the cartridge storage device 151. For instance, the system can include a short-range RFID reader that reads each tape as it passes by the scanner. The RFID reader can be mounted on the picker arm, can be mounted on a non-picker arm, can be mounted in the cartridge storage device 151 itself, and/or can be positioned opposite the front of the cartridge storage device 151 (e.g., one reader per slot). Another alternative is to use an optical scanner, e.g., bar code reader that reads optical codes (e.g., bar codes) from each cartridge as it passes thereby. The bar code reader can be mounted on the picker arm, can be mounted on a non-picker arm, can be mounted in the cartridge storage device 151 itself, and/or can be positioned opposite the front of the cartridge storage device 151 (e.g., one reader per slot).

To query the cartridge storage device 151, the system orders the cartridge storage device 151 to complete one revolution, the RFID or barcode reader reading each cartridge as it passes thereby. The system then correlates the retrieved information with the position of the cartridge in the cartridge storage device 151, e.g., cartridge A is in cell A, cartridge B is in cell B, etc. An advantage is that the system can determine the general contents of the cartridge storage device 151 without significantly detracting from system resources (e.g., by tying up one of the drives).

An alternate embodiment has an electrical sensor on each cartridge receiving cell that connect to the memory when a cartridge is present in the cartridge storage device 151. One skilled in the art will understand that a brush/rotational contact device can be used to connect the controller to the moving cells. The system can then query the cartridge storage device 151 for its contents.

A display 1442 (FIG. 13) can be coupled to the back 1408 of the housing 1404 to display identification and/or content information about the cartridges 1416 in the cartridge storage device 151. The display 1442 can be connected to the controller 1450, which identifies the cartridges 1416 as described above and sends cassette identification information to the display 1442. Illustrative information that can be displayed includes an identification number or name of a cartridge 1416, a summary of the information stored on the cartridges 1416, etc. The information displayed can be dependent upon the position of the cartridge 1416, e.g., the displayed information relates to the cartridge nearest the back 1408 of the housing 1404. Similarly, the information displayed can change as the cartridges 1416 rotate through the housing 1404.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A cartridge storage device for a data storage and retrieval system, comprising:
 a housing having a front and a back;
 a plurality of cells in the housing, each cell adapted for receiving a media cartridge;
 a drive mechanism for selectively driving the cells towards a front opening in the front of the housing, the front opening allowing insertion and retrieval of the cartridges from the cells; and
 a rear opening in the back of the housing, wherein a user can insert a cartridge onto one of the cells or retrieve a cartridge from one of the cells through the rear opening while the housing is inserted in the slot;
 wherein the front opening lies on a line tangent to a path of movement of the cells, wherein the path of movement is a plane defined by any instantaneous movement of any edge or generally planar surface of any of the plurality of cells at any point in time,
 wherein the housing is adapted for insertion in an unoccupied slot of the data storage and retrieval system.

2. The cartridge storage device according to claim 1, wherein the cartridges protrude beyond the front opening when driven towards the front opening.

3. The cartridge storage device according to claim 1, wherein the slot is also dimensioned to receive a tape drive.

4. The cartridge storage device according to claim 1, wherein the housing includes friction members thereon adapted to frictionally engage the slot.

5. The cartridge storage device according to claim 1, further comprising a display coupled to the housing, the display displaying information about the cartridges in the housing.

6. The cartridge storage device according to claim 1, further comprising a controller and a connector for allowing a data storage and retrieval system to communicate with the controller of the cartridge storage device.

7. The cartridge storage device according to claim 1, further comprising a reader mounted to the housing for reading a nonvolatile memory of a cartridge.

8. The cartridge storage device according to claim 7, wherein the reader is a Radio Frequency Identification (RFID) reader.

9. The cartridge storage device according to claim 1, further comprising an optical scanner mounted to the housing for reading an optical code of a cartridge.

10. The cartridge storage device according to claim 9, wherein the optical scanner is a bar code reader and the optical code is a bar code.

11. The cartridge storage device according to claim 1, further comprising an electrical sensor coupled to each cell for communicating with a nonvolatile memory of a cartridge.

12. The cartridge storage device according to claim 1, wherein the drive mechanism drives the cells in a closed loop through the housing.

13. The cartridge storage device according to claim 12, wherein the drive mechanism includes a motor and a belt.

14. The cartridge storage device according to claim 12, wherein the drive mechanism includes a belt operatively engaging an external motor.

15. The cartridge storage device according to claim 12, wherein the cartridges sequentially protrude beyond the front opening when traveling along the closed loop.

16. A cartridge storage device for a data storage and retrieval system, comprising:
 a housing having a front and a back;
 a plurality of cells in the housing, each cell adapted for receiving a media cartridge;
 a drive mechanism for selectively driving the cells towards a front opening in the front of the housing, the front opening allowing insertion and retrieval of the cartridges from the cells; and
 a rear opening in the back of the housing, wherein a user can view a cartridge on one of the cells through the rear opening while the housing is inserted in the slot,
 wherein the front opening lies on a line tangent to a path of movement of the cells, wherein the path of movement is a plane defined by any instantaneous movement of any edge or generally planar surface of any of the plurality of cells at any point in time,
 wherein the housing is adapted for insertion in an unoccupied slot of the data storage and retrieval system.

17. A method of providing a media cartridge to a data storage and retrieval system, comprising:
 performing a first method, comprising:
  inserting at least one media cartridge into a first opening of a cartridge storage device, wherein access to said first opening is provided by an opening in the data storage and retrieval system;
  removing said at least one media cartridge from said cartridge storage device from a second opening thereof, wherein said second opening is opposite said first opening and is on a different side of the cartridge storage device than the first opening; and inserting said at least one media cartridge into a tape drive of said data storage and retrieval system; and simultaneously performing the first method using a second cartridge storage device, a second at least one media cartridge, and the same data storage and retrieval system.

18. The method according to claim 17, further comprising retrieving information about the at least one media cartridge in the cartridge storage device using a method selected from a group consisting of: viewing the at least one media cartridge in the cartridge storage device, reading a nonvolatile memory of the at least one media cartridge, and optically scanning the at least one media cartridge.

19. The method according to claim 17, further comprising removing the cartridge storage device from the data storage and retrieval system and coupling the cartridge storage device to a second data storage and retrieval system.

20. The method according to claim 17, wherein the cartridge storage device comprises a housing having a front and a back; a plurality of cells in the housing, each cell adapted for receiving a media cartridge; and a drive mechanism for selectively driving the cells towards the second opening of the housing, the second opening allowing insertion and retrieval of the cartridges from the cells.

21. A data storage and retrieval system, comprising:
a plurality of slots adapted for receiving system components;
at least one drive for reading data from a media cartridge;
at least one cartridge storage device capable of storing several of the cartridges, the at least one cartridge storage device having a front side and a back and sidewalls extending between the front side and the back, the at least one cartridge storage device being positioned in the slots front side first, wherein each slot in which a cartridge storage device is positioned has an opening for allowing access to the front side of the cartridge storage device;
a picker for retrieving and inserting cartridges from the at least one cartridge storage device and transporting the cartridges between the at least one drive and the at least one cartridge storage device,
wherein a ratio of cartridge storage devices to drives is at least 3 to 1.

22. A data storage and retrieval system, comprising:
a plurality of slots adapted for receiving system components;
at least one drive for reading data from a media cartridge;
at least one cartridge storage device capable of storing several of the cartridges, the at least one cartridge storage device having a front side and a back and sidewalls extending between the front side and the back, the at least one cartridge storage device being positioned in the slots front side first, wherein each slot in which a cartridge storage device is positioned has an opening for allowing access to the front side of the cartridge storage device;
a picker for retrieving and inserting cartridges from the at least one cartridge storage device and transporting the cartridges between the at least one drive and the at least one cartridge storage device,
wherein at least one of the cartridge storage devices is not adjacent to any of the drives.

23. A data storage and retrieval system, comprising:
a plurality of slots adapted for receiving system components;
at least one drive for reading data from a media cartridge;
at least one cartridge storage device capable of storing several of the cartridges, the at least one cartridge storage device having a front side and a back and sidewalls extending between the front side and the back, the at least one cartridge storage device being positioned in the slots front side first, wherein each slot in which a cartridge storage device is positioned has an opening for allowing access to the front side of the cartridge storage device;
a picker for retrieving and inserting cartridges from the at least one cartridge storage device and transporting the cartridges between the at least one drive and the at least one cartridge storage device,
wherein the picker transports one cartridge from one of the cartridge storage devices to a first of the drives, wherein the picker transports another cartridge from the cartridge storage device to a second of the drives.

24. The data storage and retrieval system according to claim 23, wherein at least one of the cartridge storage devices is hot pluggable.

25. The data storage and retrieval system according to claim 23, further comprising a reader for reading a nonvolatile memory of a cartridge.

26. The data storage and retrieval system according to claim 23, further comprising an optical scanner for reading an optical code of a cartridge.

\* \* \* \* \*